United States Patent
Block et al.

[15] 3,675,210
[45] *July 4, 1972

[54] METHOD AND APPARATUS FOR THE TRANSMISSION OF ACQUIRED DATA IN THE FORM OF MAGNITUDE REPRESENTING SIGNALS AND SIGNALS REPRESENTING CHANGES OF SCALE OF MAGNITUDE

[72] Inventors: Donald Edmund Block; Nicholas George Alexakis, both of Los Angeles, Calif.

[73] Assignee: Digital Data Systems, Inc., Houston, Tex.

[ * ] Notice: The portion of the term of this patent subsequent to June 4, 1988, has been disclaimed.

[22] Filed: May 16, 1966

[21] Appl. No.: 550,240

[52] U.S. Cl. ...................................................340/172.5
[51] Int. Cl. .................................................G06f 3/05
[58] Field of Search..............340/172.5, 174.1, 174.1 G, 340/174.1 H, 15.5, 177, 178, 183, 203, 205; 235/152, 156, 157, 159, 160, 164, 92; 346/74 M

[56] References Cited

UNITED STATES PATENTS

| | | |
|---|---|---|
| 3,333,247 | 7/1967 | Hadley et al..........................340/172.5 |
| 3,277,440 | 10/1966 | Gouilloud et al. ....................340/172.5 |
| 3,196,401 | 7/1965 | Lamneck..............................340/172.5 |
| 3,156,892 | 11/1964 | Woods et al..........................340/15.5 |
| 3,197,621 | 7/1965 | Urguhart ..............................340/172.5 |
| 3,223,982 | 12/1965 | Sacerdoti et al.....................340/172.5 |
| 3,225,333 | 12/1965 | Vinal...................................340/172.5 |
| 3,275,989 | 9/1966 | Glaser et al..........................340/172.5 |
| 3,289,169 | 11/1966 | Marosz ................................340/172.5 |
| 3,315,223 | 4/1967 | Hibbard et al........................340/15.5 |

*Primary Examiner*—Gareth D. Shaw
*Attorney*—Golove & Kleinberg

[57] ABSTRACT

A data acqusisition system is described which enables efficient utilization of a limited data channel by transmitting data signals representing magnitude of a sampled parameter, together with incremental signals representing the scale or gain of the sampling apparatus. Periodically, signals are transmitted which correspond to the scale or gain setting of the sampling equipment, for updating and error correcting purposes. If desirable, the sign of each increment can be a function of the data interval, during which the increment is transmitted.

15 Claims, 6 Drawing Figures

Donald E. Block,
Nicholas G. Alexakis,
INVENTORS.

BY.

GOLOVE & KLEINBERG,
ATTORNEYS.

METHOD AND APPARATUS FOR THE TRANSMISSION OF ACQUIRED DATA IN THE FORM OF MAGNITUDE REPRESENTING SIGNALS AND SIGNALS REPRESENTING CHANGES OF SCALE OF MAGNITUDE

This invention relates to data processing and more particularly to methods and apparatus for optimizing the data storing capabilities of fixed format recording media.

In many information handling systems, the advent of large scale high-speed digital data processors has required a relative standardization of media for data input. For example, the widespread use of equipment manufactured by International Business Machines or IBM has resulted in a concomitant requirement for Hollerith-type punched cards as inputs to such equipment. Further, punched paper tape of standardized format has long been used as an input to Teletype apparatus and, similarly, the use of digital magnetic tape recording has resulted in several standard formats, depending, of course, upon the source of the digital data processing equipment with which the tape is to be used.

One system presently in widespread use has standardized on a multi-channel or multi-track system in which digital information is recorded in nine-parallel tracks and is recorded and retrieved substantially in parallel-by-bit and serially, by character. Still other magnetic tape systems utilize seven tracks for the recordation of information and still other combinations of channels or tracks are available, depending upon the equipment with which the tape is to be used.

Frequently, it is necessary to record information in more "-bits" or binary digits than are available in a single character space, or interval, for example, comprising bits in each of nine tracks. If one or more of the tracks are reserved for parity or other error checking functions, a lesser number of bits remain available to represent information. Occasionally, the number of bits of information may easily fit into one character "interval" of the tape or in multiples of a character interval which may be considered a character space. There are times, however, when a single character interval is insufficient to record all of the necessary data, and the use of two character intervals would be grossly wasteful, as when only one or two bits are recorded in the entire second character space.

In one digital system which has been utilized to record seismic data on a nine-track tape intended to be compatible with IBM equipment, and in which one track was reserved for parity, eight tracks are available for information storage. A problem arose when it was determined that no less than 15 bits would be required to represent one type of digital information and an additional four bits were necessary to supply necessary scaling information.

The use of three character intervals comprising 24 bit positions to record the required 19 bits of information would be wasteful. Moreover, three intervals per character or "byte" would increase the tape length requirements for a particular record and, at the same time, slow down the rate of data processing.

It was considered desirable to effectively record 19 bits of information in sixteen bit spaces which would necessitate the use of two serial character intervals rather than three, to store each specific character or number, representing information. Generally, it would be of value if methods and apparatus could be devised to "squeeze" extra bits of information into a limited storage area, by judicious manipulation of data and by recognizing certain redundancies inherent in the information to be recorded and retrieved.

According to the present invention, a preferred embodiment of which is especially useful in the recordation of seismic data, digital data representing the quantitative output of a transducer is digitized in 15 bits for recordation on a nine-track tape which effectively stores eight bits per interval. An additional four binary digits, representing a scaling factor, are not recorded as such, but rather are carried as single bit increments representing an incremental change in scale. The four bits actually representing the numerical value of the sealing factor are periodically transmitted as a separate character.

Since scale changes are limited to changes of a single increment in successive recordings of data, the binary number representing the scale quantity would be substantially redundant. However, the numerical quantity to be recorded, can clearly vary from reading-to-reading and might vary by as much as the magnitude of the number itself.

If a single sensor is used to provide information which is then recorded, successive data readings would be accompanied by single increments of scale change. Assuming that the data reduction rate is much greater than the rate at which the scale changes, then the system can accommodate both increases in scale as well as decreases in scale by assigning to alternate characters or bytes the function of sign.

In a first data recording interval, positive increments of scale change are recorded, and in the next interval, negative increments of scale change are recorded. From that point forward in time, in "odd" intervals, positive increments are recorded, and "even" intervals, negative increments are recorded.

With high speed digital data processors, it is then simple to maintain a storage register of four bits which can be maintained "up-to-date" by the combination of the single bit each interval and the provision of the complete scale number on a relatively infrequent basis for checking purposes. Such a combination requires only one extra character interval, on a periodic basis. This is clearly more efficient, for example, than requiring three interval bytes for each character of data to be recorded, which would require a reduction in data transmission time by one-third and an increase of length by one-half.

In the event that several sensors are to be used for data acquisition, the judicious employment of suitable commutating and decommutating circuits will permit the recording of the input from each of the sensors in serial fashion on a single record. Accordingly, a single recording and playback system can be "time shared" among the several sensors and, similarly, analog-to-digital and digital-to-analog circuits can also be time shared.

In a single sampling interval, a plurality of characters can be recorded, each representing the output of a different sensor. Utilizing the scheme outlined above for a single sensor, each character associated with a sensor, which may include more than one byte, could also include a single bit representing an incremental change of scale or gain in the sensor circuits. As before, in "even" intervals, negative increments can be recorded and in "odd" intervals, positive increments of gain can be recorded. It will be obvious to those skilled in the art that the association of sign with "odd" or "even" is a matter of design choice.

If several sensors are used in a system and these sensors are sequentially sampled and their information recorded in multiplexed fashions, a relatively simple method can be employed to periodically validate the gain information. For example, in one system employing the present invention, 26 sensors representing 26 "channels" of information were sequentially sampled and, additional characters were provided, which were denominated "psuedo channels." The psuedo channel characters contain synchronized information and, also, contain bits corresponding to the scale factor or gain number of a one of the sensors.

In the preferred embodiment, during a first sampling interval, the psuedo channels were recorded after a scan of all of the channels, and contain a scale or gain number representing the scale or gain setting of the sensor associated with the first channel. The second scan would then include scale or gain data for the second channel, and so on for the 26 sensors.

To prevent a loss of synchronization, a predetermined bit in one of the tracks which occurs during one of the psuedo channel bytes, can be normally at one value and provides a second value, only once during each cycle of 26 scans. Therefore the presence of the predetermined bit at the particular time, enables synchronization should there be a loss of information in the recording or playback process.

Alternatively, each number representing scale or gain may be presented, together with a second number representing the sensor associated therewith. However, this information can also be maintained in an external counter, controlled by a predetermined bit of the record.

Accordingly, it is an object of the present invention to provide an improved method and apparatus for transmitting digital data through a restricted communication channel.

It is yet another object of the invention to provide an improved method for communicating digital data including magnitude and scale information.

It is yet another object of the invention to provide improved means for transmitting digital data, including information relative to magnitude and scale within a limited data processing format.

It is yet another object of the invention to provide for use with a digital data link of predetermined capacity, an improved method and apparatus for utilizing the capacity of the link to furnish information with respect to scale and magnitude.

It is further object of invention to provide an improved method for communicating, in a limited number of data bits, magnitude and scale information from a data acquisition source to a storage device.

It is still another object of invention to provide an improved method for transmitting scale information relative to digital data, by transmitting only increments of scale information with each group of digits representing data.

It is a further object of invention to provide an improved system whereby positive increments of scale change are transmitting during a first data acquisition cycle and negative increments of scale change are transmitted during the next data acquisition cycle.

It is yet another object of invention to provide an improved system for transmitting data representing scale information in conjunction with digital data wherein increments of positive and negative scale change are alternately transmitted in alternate data acquisition cycles and wherein a set of digits, representing a scale setting of the data acquisition device are transmitted at periodic, predetermined intervals.

It is yet another object of invention to provide apparatus whereby a plurality of data sensors are sequentially scanned for digital information, and on alternate scans, increments of positive and negative scale change, respectively, are transmitted, and, in a second sequence, the individual data sensors transmit, at predetermined times, a scale setting thereof.

It is still a further object of invention to periodically interrogate data sensors for digital information relative to their address and scale setting.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example.

It is to be expressly understood, however, that the drawings are for the purpose of illustration and description only and are not intended as a definition of the limits of the invention.

FIG. 2, including FIGS. 2a and 2b is a block diagram of a data acquisition system in which

FIG. 3, is a more detailed block diagram of component elements of one embodiment of the system of FIG. 2a;

FIG. 5 is a representation of a portion of a record according to an alternative embodiment of the present invention.

Figure 1:
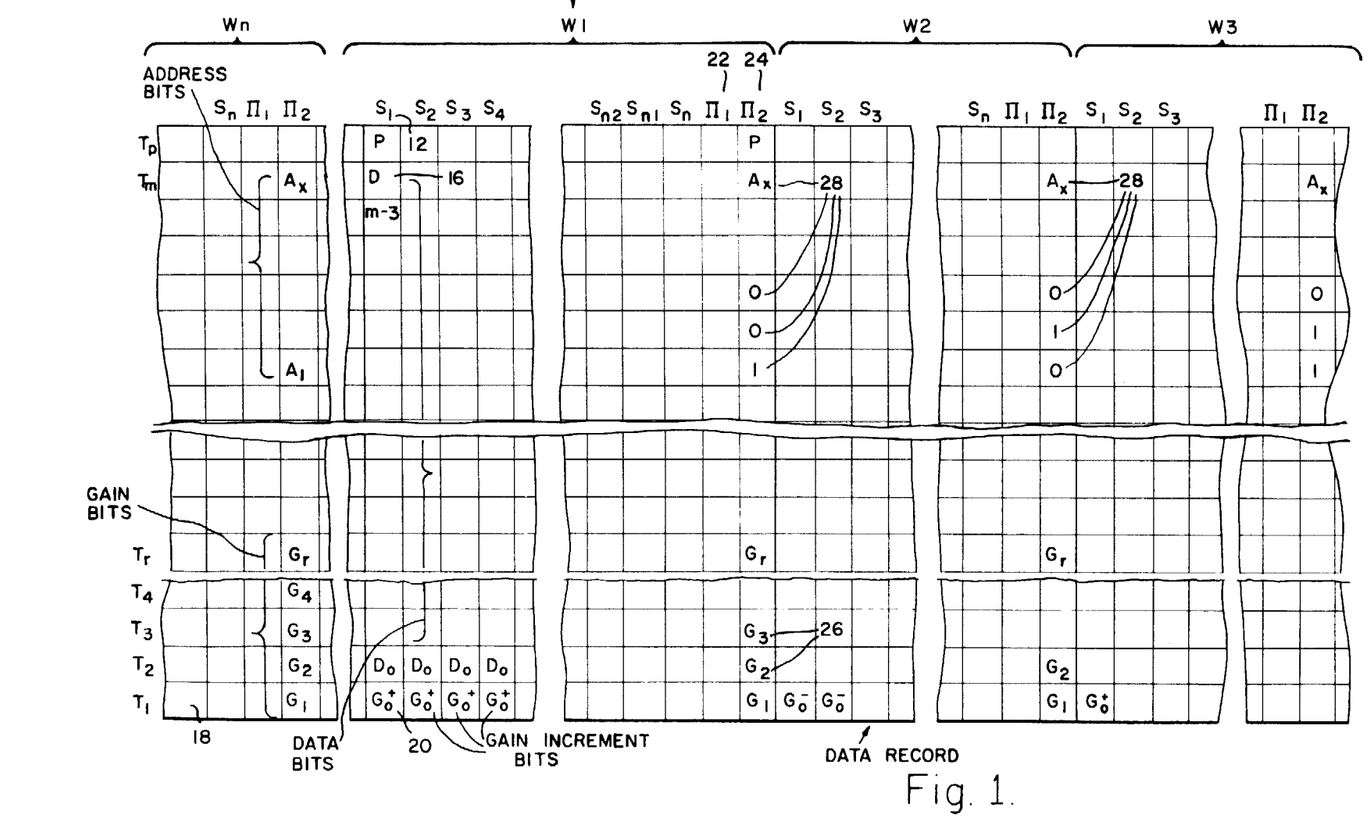
FIG. 1 is an idealized view of a record, containing information arranged in accordance with the teachings of the present invention.

Turning first to FIG. 1, there is shown an idealized diagram of an information record according to the present invention. In a preferred embodiment the record illustrated can be a magnetic tape and information stored thereon is in the form of areas of magnetization of predetermined polarity. For purposes of illustration, however, the various areas in which a single item of information can be stored will be identified, either by a one or a zero representing information stored therein or by an appropriate alpha numeric character suitably subscripted to generally identify the storage area. For the purposes of illustration, only, binary digits representing the "address" of each of a plurality of sensors is designated "$A_i$", with an appropriate subscript depending on the number of binary digits required to identify the address, $1 \leq i \leq x$.

Data representing information collected by the various sensors are represented by the letter "$D_i$", appropriately subscripted $[1 \leq i \leq (m-3)]$ to correspond to the significance of the bit. Bits representing gain or scale are denominated "G." The incremental gain bits are designated $G_o$ with a plus or minus superscript corresponding to the sense of gain. The bits corresponding to the actual scale or gain setting at the associated sensor - amplifier are represented by the subscripts $l$ through $r$. The record itself is organized into words, each representing a sample from each of the sensors. In this embodiment, two extra characters, which are denominated pseudo-characters and are represented by the Greek letter $\pi_1$, $\pi_2$ are included in each word. The words are indicated by the letter "W" subscripted $l$ through $n$. Each information channel corresponding to a different sensor is indicated by an "S," also subscripted from $l$ through $n$.

The record itself is arranged in tracks which have been designated "$T_i$" where $1 \leq i \leq m$, with a separate track assigned to parity, "$T_p$," for the purposes of error checking.

The use of indefinite subscripts $i$ in the illustration makes it clear that the invention is not limited to any particular recording device or any particular number of parallel information tracks. It is well within the concept of the invention, for example, to use a single recording channel in which all information is organized in serial fashion. It is also noted that the information channel corresponding to each sensor, need not be limited in the provision of information to the information stored in a single row of the record. It is well within the art to apportion two or more successive rows of characters to each of the information channels. Expressed in terms of the indefinite subscripts, as many as "$m$" times the number of character "rows" $-1$ bits can be used to express data in digital fashion.

In a preferred embodiment, utilizing a system compatible with the International Business Machines, "IBM" System/360 data processors, a nine-track tape format is used, in which one of the tracks is reversed for parity characters. The remaining eight tracks are then available for data and other information. In this system, a single byte corresponds to the parallel bits, that are considered to be simultaneous in time in each track. In the preferred embodiment, two bytes are assigned per channel and, accordingly, two bytes are allocated for each of the pseudo channels. Recording is continuous and gaps are not provided between words or between the last word of the cycle and the first word of the next cycle.

For purposes of synchronization in the indicated format, one of the pseudo channels contains a plurality of bits in a predetermined code combination, which if recorded in a regular channel would be considered a forbidden code combination. These characters are recognized and are utilized for timing and synchronization of the record with the internal registers of the data processing unit with which it is to be utilized.

As illustrated each vertical row represents one character space which in the preferred embodiment includes two bytes. It will be understood that if several bytes are used per channel, the gain bit need be placed in only one of them.

FIG. 1 is an idealized representation of a data record 10. A first sensor channel $S_1$ 12, of a first word, $W_1$ 14, is represented by a vertical row of information cells 16 in which bits are recorded. A first or $T_1$ track 18 includes a scale or gain increment bit 20 which in this embodiment is a positive increment, as indicated by the symbol $G_o^+$. The next bits of the same row 12 are data bits $D_o - D_{m-3}$. This pattern of information organization is repeated throughout the sensor channels $S_i$ through $S_n$. The first pseudo channel $\pi_1$, 22, may contain the predetermined, prohibited, code combination for synchronizing purposes, and in the second pseudo channel $\pi_2$, 24, there is recorded the scale or gain setting of one of the sensor channels according to a preset plan in terms of binary digits $G_l$ through $G_r$, 26.

Although included in the preferred embodiment, it is optional to include the Address of the channel whose gain and/or scale number is being recorded. These address bits 28 are designated $A_1$ through $A_x$ and are shown, for example, in words W1, W2 and W3 as the binary combinations representing the numbers "1," "2" and "3" respectively. The $n$th word, $W_n$, would therefore have, in the bits allotted to address, the binary combination representing the number "$n$."

It can then be seen, that if any information is "lost" during recording or playback, the recognition of the pseudo channel $\pi_1$, 22 and the address contained in the second pseudo channel $\pi_2$, 24, enables resynchronization of the playback circuits to the record 10, with a minimal loss of data.

In accordance with the convention mentioned above, odd subscripted "words" would carry increments of positive gain, $G_o^+$ and even subscripted "words" would include increments of negative gain $G_o^-$. Obviously, this convention can easily be reversed without departing from the present invention.

Figures 2A, 2B, 4:
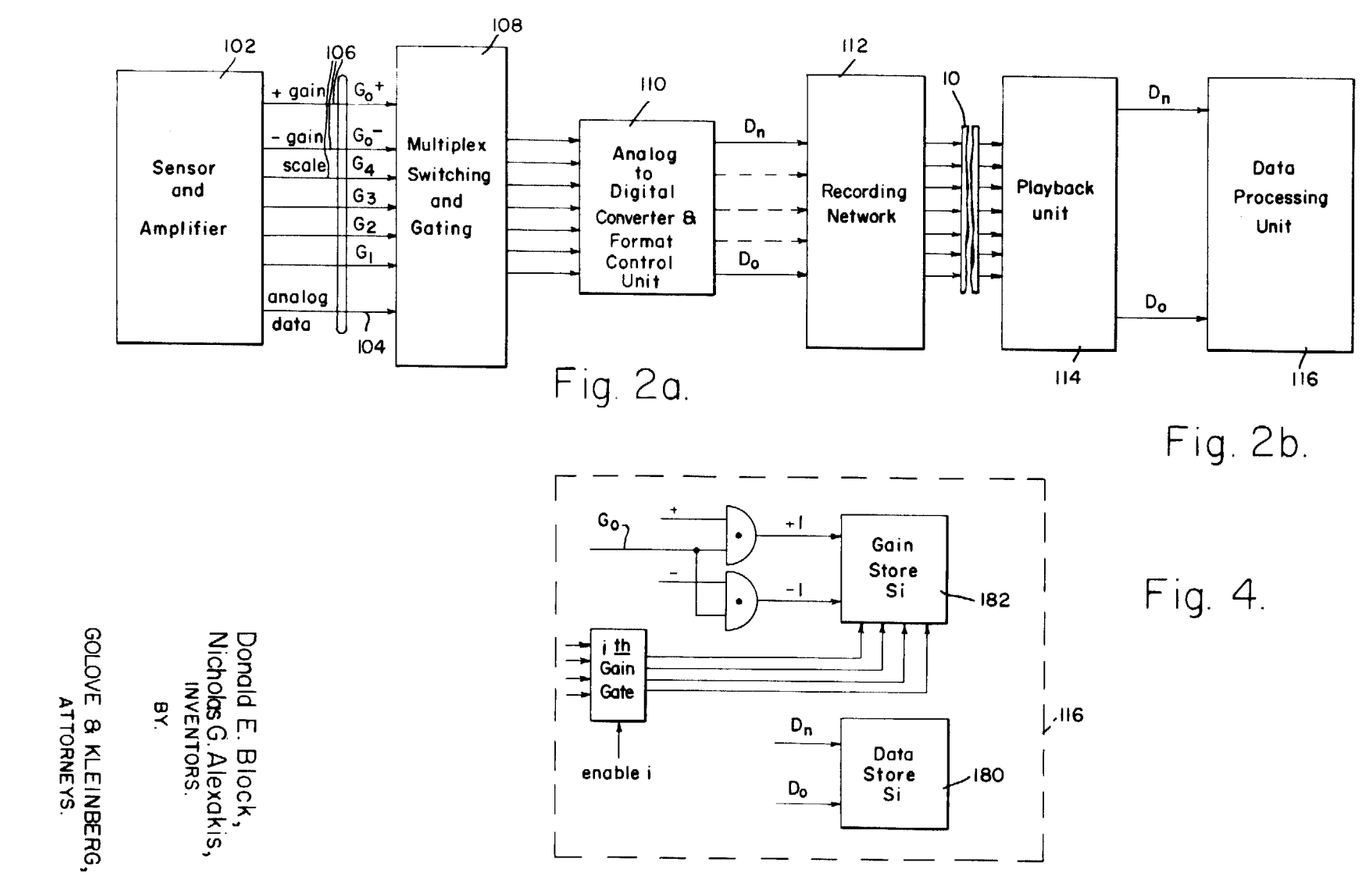
FIG. 2a shows the acquisition and recording portion and FIG. 2b shows the playback and data processing portion.
FIG. 4 is a slightly more detailed diagram of a portion of the data processing unit of FIG. 2b.

Turning next to FIG. 2, there is shown a simplified block diagram of apparatus in which the present invention is utilized. A block identified as Sensor and Amplifier 102 corresponds to the data acquisition portion of a single channel and produces, as an output, a single output line 104 containing analog data and, in this embodiment, six lines 106 of digital data respectively identified as a positive gain increment $G_o^+$ a negative gain increment, $G_o^-$ and four binary digits corresponding to the gain or scale setting of the sensor amplifier combination, $G_1$ through $G_4$.

These lines are applied to a Multiplex, Switching and Gating block 108 which, on a regular, sequential basis, once each cycle, addresses the Sensor and Amplifier 102 and transmits its data information to a time shared Analog-to-Digital Converter and Format Control Unit 110. The Analog-to-Digital converter portion converts the analog signal into binary data bits. The appropriate bits are gated through the Format Control portion. The signal output of scale and/or gain information of the Analog-to-Digital Converter and Format Control Unit is applied on a plurality of channels to a Recording network 112, which "writes" the digital information into appropriate data storage locations 16 of the Record 10.

On playback, referring to FIG. 2b, the recorded information is read by a Playback Unit 114 which applies digital information directly to a Data Processing Unit 116.

Within the Data Processing Unit 116 are circuits adequate to direct the sensor data to appropriate destinations. Other circuits are provided which recognize the incremental gain bits and still other counters and registers are provided in which the gain bits are accumulated, respectively corresponding to the sensors and amplifiers. Other circuits periodically update each gain register to correspond with the gain number in the pseudo channel.

Figures 3, 5:
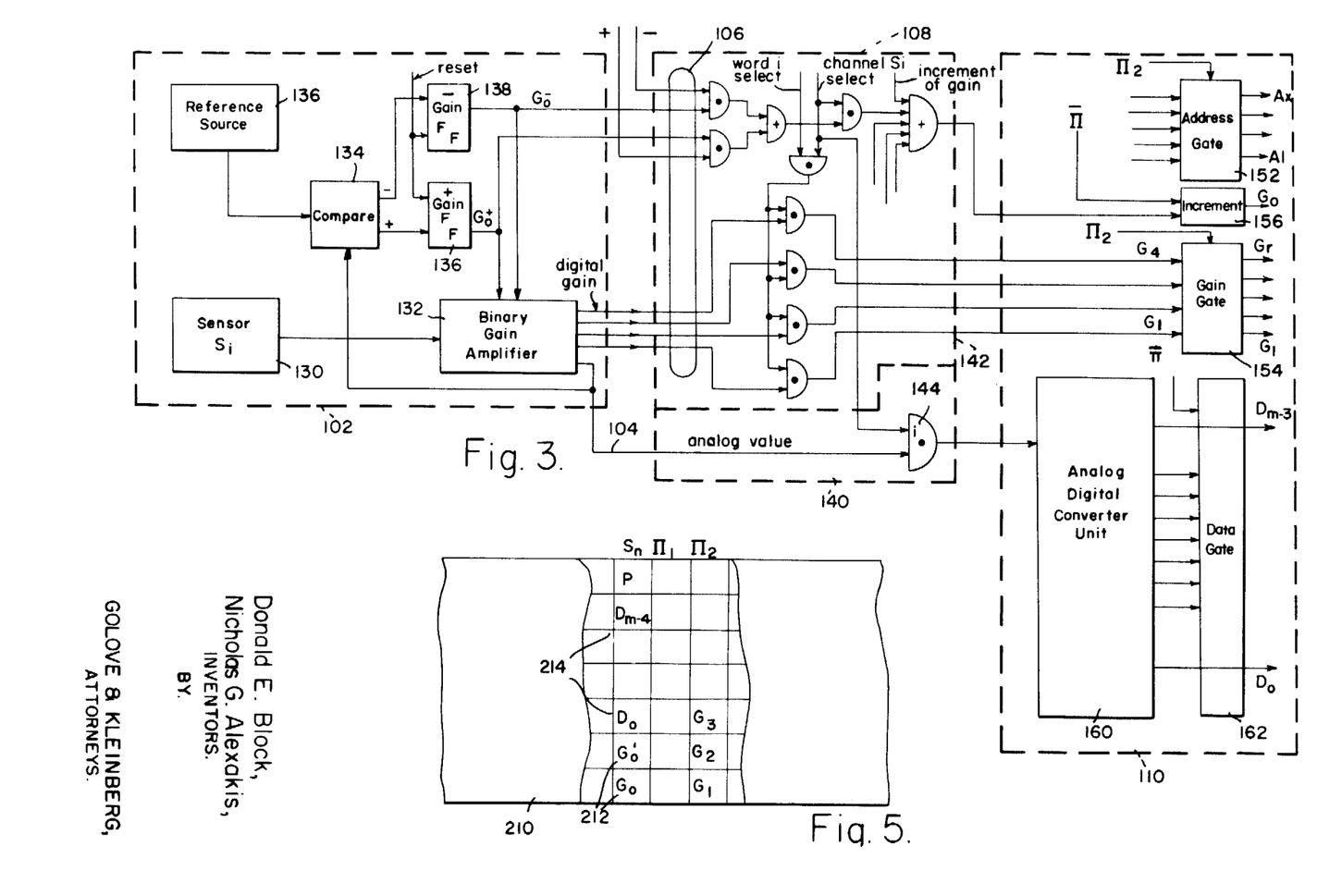

Turning next to FIG. 3, there is shown one of many possible embodiments which will provide the data organizational format of the present invention. Shown in dotted blocks are the Sensor and Amplifier unit 102, the Multiplex Switching and Gating unit 108 and the Analog-to-Digital Converter and Format Control Unit 110 of FIG. 2a.

Included within the Sensor and Amplifier block 102, is for example the $i$th sensor, $S_i$, 130, which is a transducer adapted to signal some predetermined condition in the form of an electrical signal. The output on the $i$th sensor $S_i$ 130, is applied to a Binary Gain Amplifier 132. The Binary Gain amplifier 132 provides an amplified analog signal as one of its outputs, but also is responsive to applied input signals to vary its gain characteristics by incremental amounts.

In a preferred embodiment, these increments are 6db steps, which represent a change in gain by a factor of 2. The output of the Binary Gain amplifier 132 is applied to a Comparator 134. A second input to the Comparator 134 is supplied by a reference source 136. When the output of the amplifier 132 is greater than the reference source 136 by a predetermined amount, the Comparator 134 emits a first output signal. When the reference signal is greater by a second, predetermined amount, a second output signal is provided. The Binary Gain amplifier 132 also provides, on a plurality of output lines, digital gain signals representing the gain setting or scale of the amplifier.

To change gain in the amplifier, a relatively simple circuit is provided including a + Gain flip flop 136 and a − Gain flip flop 138. These are connected to a common source of a resetting signal. One of the comparator 134 outputs is applied to the + Gain flip flop 136 and the other Comparator 134 output is applied to the − Gain flip flop 138. The output of the + Gain flip flop 136 is designated $G_o^+$ while the output of the − Gain flip flop 138 is designated $G_o^-$. These signals are also applied to the binary gain amplifier 132 to control the gain setting thereof.

If the output of the binary gain amplifier 132 is greater than the reference source 136, then it is necessary to decrease the gain. The Comparator 134 provides a − signal which sets the −Gain flip flop 138 and which also provides an appropriate negative gain increment signal, $G_o^-$. Similarly, if the output of the amplifier 132 falls below the reference source 136 and it is necessary to increase gain, the Comparator 134 provides a + signal. The + Gain flip flop 136 is set and a positive gain increment $G_o^+$ is applied to the amplifier 132.

It will then be seen that the output of the Sensor and Amplifier unit 102 is, in this embodiment, represented by one signal line 104 of analog data and six signal lines 106 of digital data, four of which represent the gain setting of the Binary Gain amplifier 132, and two of which alternatively, represent increments of gain.

These several signals are applied to the Multiplex Switching and Gating Unit 108 which, as shown, includes an analog multiplex portion 140 and a digital multiplex portion 142. As shown herein, the analog signal is applied to an i gate 144 which is enabled by the provision of a suitable Channel $S_i$ Select signal from appropriate timing and synchronizing circuits. Similarly, the digital multiplex portion 142 is also enabled by a Channel $S_i$ select signal. The channel $S_i$ select, in conjunction with a selecting signal which enables either a positive or negative gain increment will apply a single gain increment to the communicating busses of the system at the appropriate time.

The digital gain information from the Binary Gain Amplifier 132, must be further selected by the provision of a $W_i$ Select enabling signal which then permits the provision of the binary gain data to the communicating busses.

It will be understood that selecting circuits for multiplexing and/or commutating are well known in the art and accordingly, will not be described herein. It is sufficient to note that in any given time interval, only a single increment of gain is communicated in the preferred embodiment, and, as explained above, during odd subscripted words, the negative increments are recorded while during even subscripted words, the negative increments are recorded.

In the analog digital and format control unit 110, control signals are provided which identify non-pseudo channels or the pseudo channel in which information is to be recorded From appropriate selecting registers associated with the Multiplex Switching and Gating unit 108, a plurality of bits are applied to an Address gate 152 which is enabled by the second pseudo channel select $\pi_2$. Similarly, the number representing the gain of the sensor corresponding to the address are applied to a Gain gate 154 which is also enabled by $\pi_2$. The signal incremental gain bits of $G_o$, are applied to an Increment gate 156 which is enabled by a signal representing the selection of any channel other than a pseudo channel, represented by $\overline{\pi}$. An Analog-to-Digital converter 160 generates a plurality of binary digits representative of the magnitude of the applied analog input signal. The digital signals are applied to a Data gate 162 which is also enabled by the $\overline{\pi}$ signal, indicating that in any character interval associated with a sensor channel, the output of the Analog-to-Digital converter and Format Control Unit 110 will be a plurality of binary digits representing digital data from one of the sensors and a single bit representing incremental gain.

During a pseudo channel interval, however, a plurality of bits will be provided during the first pseudo channel, $\pi_1$ representing a forbidden code combination and, during the second pseudo channel $\pi_2$ a plurality of bits will be applied representing gain information and address information, corresponding to the source of the gain information.

Turning next to FIG. 4, there is indicated a portion of a data processing unit 116 indicating the presence of $S_i$ Data storage register 180 corresponding to the $i$th sensor, and an $S_i$ Gain store 182, which may be a part of the $S_i$ Data store 180. As shown, the single bits of incremental gain are appropriately gated by + or − enabling signals, which are controlled by a recognition of the word in which the increments are provided. These signals are alternatively applied to the Gain storage register 182 to count up or down the number stored therein, respectively.

Similarly, the several bits of gain information in the pseudo channel which is recognized as applicable to the $i$th channel, are applied to either correct or replace the number in the Gain storage register 182. The Enable $i$ signal can either be derived from a running counter within the Data Processing Unit or may be generated from a selection matrix driven by the Address number recorded in the pseudo channel and is applied to an $i$th Gain Gate 184.

Clearly, the implementation of the hardware to utilize the format according to the present invention, is well within the skill of the art and is entirely a matter of design choice.

Turning finally to FIG. 5, there is indicated in a most generalized form, a portion of an alternative record 210 in which more than one incremental gain bit is stored 212, in combination with the several data bits 214. This embodiment would be useful in applications where the analog signal amplitude changes rapidly with respect to the sampling interval, and in which more than one increment of gain might be required between successive samplings.

It is clear that an interim storage register can be provided which is in effect, a subsidiary counter, operating in conjunction with the binary gain amplifier. A two-stage counter could enable the signalling of as many as three increments of positive or negative gain, if positive and negative increments alternative on successive scans.

It is also to be noted that if two bits are utilized for incremental gain information, on each scan the gain increment could be recorded with one of the bits representing sign and the oter representing magnitude. The physical quantity being signaled may be adequately represented in a lesser number of binary digits if magnitude varies widely so that the use of an additional bit for gain would not adversely affect the acquisition of data.

Other modifications and variations will be obvious to those skilled in the art, without departing from the teaching of the present invention. Accordingly, the scope of invention should be limited only by the following claims appended hereto.

What is claimed as new is:

1. In a data acquisition system adapted to provide scale and magnitude information to a data processing system from remote variable scale sensors through a digital data transmission link which has a predetermined number of parallel data channels for transmitting information parallel by bit and serial by character, the combination comprising:

A. first means coupled to a remote sensor for periodically sampling the sensor output and generating first digital signals representative of the magnitude of a physical parameter;
B. second means connected to said first means and the sensor for generating second digital signals representative of the relative scale of said first digital signals;
C. third means coupled to said second means for generating third digital signals representing incremental changes in scale between successive samplings; and
D. recording means adapted to be coupled to the transmission link including scale digit recording means coupled to said third means and adapted to be coupled to a one of the parallel data channels of the transmission link, for recording said third digital signals in a data channel; and data digit recording means coupled to said first means and adapted to be coupled to the remaining ones of the parallel data channels of the transmission link, for recording said first digital signals in a plurality of data channels corresponding to the predetermined number of the parallel data channels, less one, whereby in each sampling interval, a digital signal is recorded in parallel data channels, including a plurality of parallel, first digital signals corresponding to magnitude, and a third digital signal, corresponding to an incremental change of scale, said recording means being adapted to apply the signals recorded therein to the predetermined number of parallel data channels of the transmission link.

2. The combination of claim 1, said recording means further including fourth means connected to said second means and adapted to be coupled to the transmission link, for periodically recording said second digital signals in parallel data channels, for subsequent application to the transmission link data channels.

3. The combination of claim 1 wherein said scale digit recording means are operable in a first sampling interval to record negative valued third digital signals and in a next sampling interval to record positive valued third digital signals.

4. The combination of claim 3 including fourth means connected to said second means and said recording means, for periodically recording said second digital signals in the parallel channels, for subsequent application to the transmission link data channels.

5. In a data acquisition system adapted to be connected to a plurality of variable scale sensors for transmitting digital signals representing scale and magnitude of desired physical parameters through a transmission link which has a predetermined number of parallel data channels for the transmission of information parallel by bit and serial by character, the combination comprising:

A. first means connected to the plurality of sensors for cyclically sampling and generating first digital signals representative of the magnitude of the output of each of the sensors in a predetermined sequence;
B. second means connected to said first means and the plurality of sensors for cyclically sampling and generating second digital signals representative of the relative scale of the corresponding first digital signals;
C. third means coupled to said second means for cyclically generating a plurality of third digital signals respectively representing incremental changes in scale of the plurality of sensors between successive samplings; and
D. recording means adapted to be coupled to the transmission link data channels, including scale digit recording means coupled to said third means and adapted to be coupled to a one of the parallel data channels of the transmission link for recording in a data channel, digital signals representing positive and negative increments of scale change in alternate sampling cycles; and data digit recording means coupled to said first means and adapted to be coupled to the remaining ones of the parallel data channels of the transmission link, for recording said first digital signals in a plurality of data channels corresponding to the predetermined number of the parallel data channels, less one, whereby in each sampling cycle a plurality of digital signal combinations, respectively corresponding to the plurality of sensors, are recorded in parallel data channels, each signal combination, including a group of parallel, first digital signals representing the magnitude of a physical parameter, and a third digital signal representing an incremental change of scale associated therewith, being produced in a predetermined serial sequence, and whereby, in alternate sampling cycles, positive and negative increments of scale change are recorded, respectively, said recording means being adapted to apply the signals recorded therein to the predetermined number of parallel data channels of the transmission link.

6. The combination of claim 5, said recording means further including fourth means connected to said second means, for recording, in parallel channels, the second signals corresponding to a different one of the sensors in each successive sampling cycle, whereby the scale of each sensor can be applied to the transmission link data channels in a different sampling cycle of the plurality.

7. The combination of claim 6, said recording means further including fifth means connected to said fourth means for generating address signals identifying the sensor whose scale value is being concurrently recorded and for recording the address signals with said second signals corresponding thereto.

8. In combination with a data acquisition system adapted to provide scale and magnitude information to a data processing system from a remote, variable scale sensor through a digital data transmission link which has a predetermined number of parallel data channels for transmitting information parallel by bit and serial by character, a data processing unit comprising:
   A. first means coupled to the transmission link for storing signals representing the sensor data output, corresponding to the magnitude of a physical parameter;
   B. second means coupled to the transmission link for accumulating signals representative of the incremental changes in scale of the sensor, to maintain a stored value, corresponding to the scale of the sensor; and
   C. third means coupled to the transmission link and said second means for periodically receiving scaling signals representing the scale of the sensor and for storing the scaling signals in said second means, replacing the accumulated stored value, to update the contents of said second means, whereby errors resulting from a gain or a loss of an increment of scale change are periodically corrected.

9. The combination of claim 8 wherein the data acquisition system is also adapted to provide preselected synchronizing signals for distinguishing as between positive and negative increments, and further including fourth means coupled to the transmission link and said second means and responsive to a preselected synchronizing signal for alternately adding and subtracting the incremental change signals on successive data transmissions, whereby increment representing signals are alternatively regarded as positive and negative increments relative to their receipt with respect to the synchronizing signal.

10. Data recording and storage means for use with a data acquisition system adapted to be connected to a plurality of variable scale sensors for transmitting a corresponding plurality of digital signals representing scale and magnitude of desired physical parameters through a transmission link which has a predetermined number of parallel data channels for the transmission of digital data parallel by bit and serial by character, the system including first means connected to the plurality of sensors for cyclically sampling the output of each sensor in a predetermined sequence and generating first digital signals representative of the magnitude of a physical parameter, second means connected to the first means and a plurality of sensors for cyclically sampling each sensor for generating second digital signals representative of the relative scale of the corresponding first digital signals and third means coupled to the second means for generating third digital signals representing incremental changes in scale between successive samplings of each sensor, the data recording and storage means being adapted to be connected to the transmission link, and comprising:
   A. a group of parallel channels adapted to store digital signals parallel by bit and serial by character;
   B. means for recording and storing in a one of said channels of said group, the third digital signals, corresponding to positively and negatively valued increments in alternate samples, respectively; and
   C. means for recording in predetermined other channels of said group, the first digital signals representing the magnitude of a physical parameter;

whereby each parallel group of bits comprising a character includes a predetermined number of magnitude representing bits and at least one bit representing incremental changes of scale of the magnitude quantity since the next prior sampling interval.

11. A data transmission link for use in combination with a data acquisition system capable of generating an $n$-bit number representing the magnitude of a physical parameter and an $m$-bit number representing the relative scale of magnitude of the parameter, where $n > m$, and $(r+1)p > (m+n)rp$, "$m$," "$n$," "$r$" and "$p$" being integers, the data transmission link comprising:
   A. a record having "$p$" parallel data channels for storing digital data in parallel by bit and serial by character,
   B. incrementing means for successively sampling the $m$-bit number representing relative scale to generate an $i$-bit incremental number representing changes in scale as between successive sampling intervals, $i$ being an integer; and
   C. means for recording signals representing said incremental number together with signals representing said magnitude number such that $rp \geq (n+i)$; whereby magnitude and scale information are economically recorded and transmitted using said $p$-channel record.

12. The combination of claim 11 including means for periodically recording in said "$p$" channels, the $m$-bit scale number.

13. The method of recording data acquired from a data sensor comprising the steps of:
   A. periodically sampling the data sensor to generate a first multi-bit number representing the magnitude of a parameter;
   B. periodically sampling the data sensor to generate a second multi-bit number representing the scale associated with said first multi-bit number;
   C. comparing successive scale representing numbers to generate a third number representing incremental scale changes as between successive samples;
   D. recording said first multi-bit number in a parallel channel record in the requisite number of bit storage cells of a character interval;
   E. recording said third number together with said first multi-bit number to substantially occupy the remaining cells in an integral number of character intervals, and
   F. recording third numbers representing positive and negative increments of scale change, in alternate character intervals.

14. The method of claim 13 further including the steps of periodically recording said second multi-bit number in a character interval of the parallel channel record.

15. The method of claim 14 further including the steps of:
   A. sampling a plurality of sensors to generate first multi-bit numbers, each respectively corresponding to the magnitude of the physical parameter sensed by each of the sensors;
   B. serially sampling each of the plurality of sensors in a predetermined sequence; and
   C. recording, during each sampling cycle, the second multi-bit number of a different sensor;

whereby the plurality of sensors are interrogated for magnitude through a first cycle, for positive and negative increments of scale change in alternate cycles, and for scale representing numbers in a second cycle, corresponding to the scan sequence.

* * * * *

UNITED STATES PATENT OFFICE
CERTIFICATE OF CORRECTION

Patent No. 3,675,210     Dated July 4, 1972

Inventor(s) Donald Edmund Block; Nicholas George Alexakis

It is certified that error appears in the above-identified patent and that said Letters Patent are hereby corrected as shown below:

Col. 1, line 74, After "of the" change "sealing" to --scaling--

Col. 4, line 52, Change "reversed" to --reserved--

Col. 7, line 60, Change "oter" to --other--

Col. 9, line 72, After "means" change "and a" to --and the--

Claim 11, line 25, Change "(m+n) rp," to --(m+n) > rp,--

Signed and sealed this 26th day of December 1972.

(SEAL)
Attest:

EDWARD M. FLETCHER, JR.
Attesting Officer

ROBERT GOTTSCHALK
Commissioner of Patents